US011240866B2

(12) United States Patent
Zhang et al.

(10) Patent No.: US 11,240,866 B2
(45) Date of Patent: Feb. 1, 2022

(54) COMMUNICATION METHOD, TERMINAL, AND ACCESS NETWORK DEVICE

(71) Applicant: Huawei Technologies Co., Ltd., Shenzhen (CN)

(72) Inventors: Hongping Zhang, Shanghai (CN); Qinghai Zeng, Shanghai (CN); Mingzeng Dai, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 16/514,452

(22) Filed: Jul. 17, 2019

(65) Prior Publication Data
US 2019/0342832 A1 Nov. 7, 2019

Related U.S. Application Data

(63) Continuation of application No. PCT/CN2017/118924, filed on Dec. 27, 2017.

(30) Foreign Application Priority Data

Jan. 26, 2017 (CN) .......................... 201710057300.7

(51) Int. Cl.
*H04W 76/27* (2018.01)
*H04W 76/19* (2018.01)
(Continued)

(52) U.S. Cl.
CPC .......... *H04W 76/27* (2018.02); *H04W 48/20* (2013.01); *H04W 52/0229* (2013.01); *H04W 76/19* (2018.02); *H04W 76/30* (2018.02)

(58) Field of Classification Search
CPC . H04W 76/27; H04W 76/19; H04W 52/0229; H04W 76/30; H04W 76/38; H04W 52/0209; H04W 52/0225
See application file for complete search history.

(56) References Cited

U.S. PATENT DOCUMENTS 10,750,380 B2 * 8/2020 Fujishiro ............... H04W 24/02
10,841,768 B2 * 11/2020 Ke .......................... H04L 67/16
(Continued)

FOREIGN PATENT DOCUMENTS

CN 104871608 A 8/2015
CN 105898894 A 8/2016
(Continued)

OTHER PUBLICATIONS

InterDigital Communications, RAN Controlled State for New Radio Access. 3GPP TSG-RAN WG2 #95-BIS, R2-166865, Kaohsiung, Taiwan, Oct. 10-14, 2016, 6 pages.
(Continued)

*Primary Examiner* — Min Jung
(74) *Attorney, Agent, or Firm* — Slater Matsil, LLP

(57) ABSTRACT

This application provides a communication method, a terminal, and an access network device. The method includes: sending, by a terminal in an RRC inactive state, first information to a first access network device, where the first information is used to indicate that the terminal is located in a wireless network area in which the terminal is in the RRC inactive state, and the first access network device is an access network device to which a cell in which the terminal is currently located belongs; receiving, by the terminal, a first message sent by the first access network device; and remaining, by the terminal, in the RRC inactive state based on the first message, or entering an idle state from the RRC inactive state based on the first message. According to the technical solutions of this application, performance of a communications system can be improved.

15 Claims, 7 Drawing Sheets

(51) Int. Cl.
*H04W 76/30* (2018.01)
*H04W 52/02* (2009.01)
*H04W 48/20* (2009.01)

(56) References Cited

U.S. PATENT DOCUMENTS

| | | | |
|---|---|---|---|
| 10,863,394 B2* | 12/2020 | Kim | H04W 76/28 |
| 10,986,655 B2* | 4/2021 | Ryoo | H04W 72/1284 |
| 2015/0282082 A1 | 10/2015 | Landais et al. | |
| 2018/0206248 A1 | 7/2018 | Zhang et al. | |
| 2018/0213575 A1* | 7/2018 | Chen | H04W 76/27 |
| 2018/0220487 A1* | 8/2018 | Wu | H04W 76/27 |
| 2018/0234890 A1* | 8/2018 | Shih | H04W 36/0005 |
| 2018/0234894 A1 | 8/2018 | Jiang | |
| 2019/0082490 A1 | 3/2019 | Zhang et al. | |
| 2019/0174571 A1* | 6/2019 | Deenoo | H04W 76/11 |
| 2019/0191483 A1* | 6/2019 | Ryoo | H04W 76/27 |
| 2019/0215798 A1* | 7/2019 | Kim | H04W 68/02 |
| 2019/0274074 A1* | 9/2019 | Lee | H04W 36/0055 |
| 2020/0037210 A1* | 1/2020 | Rugeland | H04W 76/11 |
| 2020/0120592 A1* | 4/2020 | Geng | H04W 76/30 |
| 2020/0196234 A1* | 6/2020 | Turtinen | H04W 52/0274 |
| 2020/0314667 A1* | 10/2020 | Fujishiro | H04W 64/00 |
| 2020/0336888 A1* | 10/2020 | Koskela | H04L 69/28 |
| 2021/0120463 A1* | 4/2021 | Kim | H04L 5/0091 |

FOREIGN PATENT DOCUMENTS

| | | | |
|---|---|---|---|
| CN | 106658758 A | 5/2017 | |
| EP | 2645804 A1 | 10/2013 | |
| WO | 2015005853 A2 | 1/2015 | |
| WO | 2015085273 A1 | 6/2015 | |
| WO | 2016077229 A1 | 5/2016 | |
| WO | 2016089349 A1 | 6/2016 | |
| WO | 2017045149 A1 | 3/2017 | |
| WO | 2017200481 A1 | 11/2017 | |

OTHER PUBLICATIONS

RAN WG3 Meeting NR Ad Hoc, R3-170156, "Inactive state principles", Qualcomm Incorporated,Spokane, Washington, USA, Jan. 17-19, 2017, 3 pages.

Intel Corporation, "Discussion on RAN notification area for the new RRC state," 3GPP TSG RAN WG2 Meeting #96, R2-168524, Reno, USA, Nov. 14-18, 2016, 3 pages.

Samsung, "NR RRC state machine, transitions and signalling procedures," 3GPP TSG-RAN WG2 Meeting NR Ad-hoc, R2-1700007, Spokane, USA, Jan. 17-19, 2017, 6 pages.

MTI, "UE RRC State Transition in New Radio," 3GPP TSG-RAN WG2 NR Ad hoc, R2-1700037, Spokane, USA, Jan. 17-19, 2017, 4 pages.

Nokia et al., "RRC Inactive procedures," 3GPP TSG-RAN WG2 Meeting NR Ad Hoc, R2-1700104, Spokane, USA, Jan. 17-19, 2017, 5 pages.

NEC, "Cell reselection crossing RAN notification area boundary", 3GPP TSG-RAN WG2 #NR Ad Hoc, R2-1700593, Jan. 17-19, 2017, 3 pages, Spokane, USA.

* cited by examiner

COMMUNICATION METHOD, TERMINAL, AND ACCESS NETWORK DEVICE

CROSS-REFERENCE TO RELATED APPLICATIONS

This application is a continuation of International Application No. PCT/CN2017/118924, filed on Dec. 27, 2017, which claims priority to Chinese Patent Application No. 201710057300.7, filed on Jan. 26, 2017. The disclosures of the aforementioned applications are hereby incorporated by reference in their entireties.

TECHNICAL FIELD

This application relates to the communications field, and more specifically, to a communication method, a terminal, and an access network device.

BACKGROUND

To cope with increasing traffic demands and services having various different requirements, the 3GPP standards organization is currently formulating a standard for a next-generation mobile communications system. An inactive state is a newly introduced radio resource control (RRC) state, and is referred to as an "RRC inactive state" or an "inactive state" below. As in an idle state, in the inactive state, a terminal disconnects an RRC connection from a network, and does not need to receive downlink data, so that a power saving effect the same as that in the idle state is achieved. Different from the idle state, in the inactive state, the terminal and an access network device store a context of the terminal, so that when the terminal needs to enter a connected state, for example, when the terminal needs to send uplink data, or when the network pages the terminal to instruct the terminal to enter the connected state, the terminal can resume to the connected state based on the stored context of the terminal.

A resource is occupied to store the context of the terminal, and if the context of the terminal is released, the terminal cannot quickly resume to the connected state. In addition, the terminal may be located, for a long time, in a wireless network area in which the terminal is in the RRC inactive state, or may move out of the wireless network area. Therefore, how to effectively process the RRC inactive state of the terminal to improve performance of a communications system is a technical problem to be urgently resolved.

SUMMARY

This application provides a communication method, a terminal, and an access network device, to improve performance of a communications system.

According to a first aspect, a communication method is provided, including: sending, by a terminal in a radio resource control RRC inactive state, first information to a first access network device, where the first information is used to indicate that the terminal is located in a wireless network area in which the terminal is in the RRC inactive state, and the first access network device is an access network device to which a cell in which the terminal is currently located belongs; receiving, by the terminal, a first message sent by the first access network device; and remaining, by the terminal, in the RRC inactive state based on the first message, or entering an idle state from the RRC inactive state based on the first message.

In this embodiment of this application, the terminal sends the first information to the first access network device, to indicate that the terminal is located in the wireless network area in which the terminal is in the RRC inactive state. In this way, an RRC status of the terminal on a network side keeps consistent with an RRC state of the terminal on a terminal side, so that the RRC state of the terminal can be effectively configured and a stored context of the terminal can be effectively processed, thereby improving performance of a communications system.

In some possible implementations, before the sending, by a terminal, first information to a first access network device, the method further includes: receiving, by the terminal in an RRC connected state, second information sent by a second access network device, where the second information is used to instruct the terminal to enter the RRC inactive state from the RRC connected state, and the second access network device is a serving access network device that is of the terminal in the RRC connected state before the terminal enters the RRC inactive state; and entering, by the terminal, the RRC inactive state from the RRC connected state based on the second information, and starting a first timer based on the second information; and the sending, by a terminal, first information to a first access network device includes: sending, by the terminal, the first information to the first access network device when the first timer expires.

In some possible implementations, the second information further indicates a first validity period or first timer duration, and duration of the first timer is shorter than the first validity period or duration of the first timer is the first timer duration.

In some possible implementations, the first message is used to instruct the terminal to remain in the RRC inactive state, and the method further includes: restarting, by the terminal, the first timer when receiving the first message.

In some possible implementations, the first message is used to instruct the terminal to remain in the RRC inactive state, and the first message includes a second validity period or second timer duration; and the method further includes: starting, by the terminal, a second timer when receiving the first message, where duration of the second timer is shorter than the second validity period or duration of the second timer is the second timer duration.

The terminal remains in the RRC inactive state, so that the terminal can quickly resume to the connected state when the terminal needs to enter the connected state.

In some possible implementations, duration of a timer may alternatively be determined in another manner, for example, a preconfiguration manner or an agreed-on manner.

In some possible implementations, the first information may be sent in a random access process without a need for a process such as establishing an RRC connection or setting up a bearer; or the terminal sends the first information on a shared resource through contention.

In some possible implementations, the first information may be RRC resume request information. Different from common RRC resume request information, the first information carries information (for example, a cause value) indicating that "the terminal is in the wireless network area". The access network device learns, based on the information, that the terminal does not need to enter the connected state, and therefore the process such as establishing an RRC connection or setting up a bearer is not required.

In some possible implementations, the first information may alternatively be newly introduced signaling information.

In some possible implementations, if the terminal does not receive the first message within a specific time period, the terminal may release a context of the terminal, and enters the idle state from the RRC inactive state.

In some possible implementations, the terminal in the RRC inactive state sends no TAU message to a core network.

In this way, the core network can be prevented from considering that the terminal encounters an error (the terminal in the connected state should not send a TAU message) and consequently releasing a connection corresponding to the terminal.

According to a second aspect, a communication method is provided, including: receiving, by a first access network device, first information sent by a terminal in a radio resource control RRC inactive state, where the first information is used to indicate that the terminal is located in a wireless network area in which the terminal is in the RRC inactive state, and the first access network device is an access network device to which a cell in which the terminal is currently located belongs; and sending, by the first access network device, a first message to the terminal, where the first message is used to instruct the terminal to remain in the RRC inactive state or enter an idle state from the RRC inactive state.

In this embodiment of this application, the first access network device receives the first information sent by the terminal, and the first information indicates that the terminal is located in the wireless network area in which the terminal is in the RRC inactive state. In this way, an RRC status of the terminal on a network side keeps consistent with an RRC status of the terminal on a terminal side, so that the RRC status of the terminal can be effectively configured and a stored context of the terminal can be effectively processed, thereby improving performance of a communications system.

In some possible implementations, the first message is used to instruct the terminal to remain in the RRC inactive state; and before the sending, by the first access network device, the first message to the terminal, the method further includes: resetting, by the first access network device, a validity period of a context of the terminal.

In some possible implementations, the first information is sent by the terminal when a first timer expires; and when the first message is used to instruct the terminal to remain in the RRC inactive state, the first message is further used to instruct the terminal to restart the first timer; or the first message is further used to instruct the terminal to start a second timer, where the first message includes a second validity period or second timer duration, and duration of the second timer is shorter than the second validity period or duration of the second timer is the second timer duration.

In some possible implementations, the first access network device is not a serving access network device that is of the terminal in an RRC connected state before the terminal enters the RRC inactive state; before the sending, by the first access network device, the first message to the terminal, the method further includes: sending, by the first access network device, third information to a second access network device, where the third information is used to indicate that the terminal is located in the wireless network area, and the second access network device is the serving access network device that is of the terminal in the RRC connected state before the terminal enters the RRC inactive state; and receiving, by the first access network device, the third message sent by the second access network device, where the third message is used to instruct the terminal to remain in the RRC inactive state or enter the idle state from the RRC inactive state; and the sending, by the first access network device, the first message to the terminal includes: sending, by the first access network device, the first message to the terminal based on the third message.

In some possible implementations, the third information carries an ID of the terminal. The ID is an ID of the terminal in the RRC inactive state, and for example, may be referred to as a resume ID.

In some possible implementations, the resume ID may be assigned according to the following method: In this fixed range, an access network device is fixedly used as a resume ID assigner; when an interface (Xn interface) between base stations is being established, the assigner assigns a resume ID range available to each access network device; and when an access network device considers that the access network device needs to obtain more resume IDs, the access network device may apply to the assigner for more resume IDs. Optionally, an additional entity may be responsible for resume ID assignment.

In some possible implementations, if the first access network device does not receive any first information of the terminal all the time, the first access network device may release the stored context of the terminal after the validity period.

In some possible implementations, if the first access network device determines not to keep the terminal in the RRC inactive state any more, the first access network device sends the first message, to instruct the terminal to enter the idle state from the RRC inactive state. In this case, if the first access network device stores the context of the terminal, the first access network device may release the context of the terminal. In this case, optionally, the first access network device may further send information to another access network device in the wireless network area, to instruct the another access network device to release the context of the terminal.

According to a third aspect, a communication method is provided, including: receiving, by a second access network device, third information sent by a first access network device, where the third information is used to indicate that a terminal is located in a wireless network area in which the terminal is in a radio resource control RRC inactive state, the second access network device is a serving access network device that is of the terminal in an RRC connected state before the terminal enters the RRC inactive state, and the first access network device is an access network device to which a cell in which the terminal is currently located belongs; and sending, by the second access network device, a third message to the first access network device, where the third message is used to instruct the terminal to remain in the RRC inactive state or enter an idle state from the RRC inactive state.

In this embodiment of this application, the second access network device receives the third information sent by the first access network device, and the third information indicates that the terminal is located in the wireless network area in which the terminal is in the RRC inactive state. In this way, an RRC status of the terminal on a network side keeps consistent with an RRC status of the terminal on a terminal side, so that the RRC status of the terminal can be effectively configured and a stored context of the terminal can be effectively processed, thereby improving performance of a communications system.

In some possible implementations, the third message is used to instruct the terminal to remain in the RRC inactive state; and before the sending, by the second access network device, the third message to the first access network device, the method further includes: resetting, by the second access network device, a validity period of a context of the terminal.

In some possible implementations, before the receiving, by a second access network device, third information sent by a first access network device, the method further includes: sending, by the second access network device, second information to the terminal in the RRC connected state, where the second information is used to instruct the terminal to enter the RRC inactive state from the RRC connected state, and start a first timer.

The third information is sent by the first access network device based on first information that is sent by the terminal when the first timer expires.

In some possible implementations, the second information further indicates a first validity period or first timer duration, and duration of the first timer is shorter than the first validity period or duration of the first timer is the first timer duration.

In some possible implementations, the third message is used to instruct the terminal to remain in the RRC inactive state; and the third message is further used to instruct the terminal to restart the first timer; or the third message is further used to instruct the terminal to start a second timer, where the third message includes a second validity period or second timer duration, and duration of the second timer is shorter than the second validity period or duration of the second timer is the second timer duration.

In some possible implementations, when the third message is used to instruct the terminal to remain in the RRC inactive state, the second access network device resets the validity period of the context of the terminal. When the third message is used to instruct the terminal to enter the idle state from the RRC inactive state, the second access network device releases the context of the terminal, and releases a connection that corresponds to the terminal and that is between an access network and a core network.

According to a fourth aspect, a communication method is provided, including: sending, by a terminal, fourth information to a third access network device, where the fourth information is used to indicate that the terminal has moved out of a first wireless network area in which the terminal is in a radio resource control RRC inactive state; receiving, by the terminal, a fourth message sent by the third access network device; and entering, by the terminal, an idle state from the RRC inactive state based on the fourth message, or remaining in the RRC inactive state based on the fourth message.

In this embodiment of this application, the terminal sends the fourth information to the third access network device, to indicate that the terminal has moved out of the first wireless network area in which the terminal is in the RRC inactive state. In addition, based on the fourth message sent by the third access network device, the terminal enters the idle state from the RRC inactive state or remains in the RRC inactive state. In this way, an RRC status of the terminal can be updated in a timely manner, the RRC status of the terminal can be flexibly configured, and an access network device in an original wireless network area can release a context of the terminal in a timely manner, so that service experience of the terminal can be improved, and performance of a communications system can be improved.

In some possible implementations, before the sending, by a terminal, fourth information to a third access network device, the method further includes: switching, by the terminal in the RRC inactive state, to a first cell, where the first cell is not in the first wireless network area, and the third access network device is an access network device to which the first cell belongs; and the entering, by the terminal, an idle state from the RRC inactive state, or remaining in the RRC inactive state includes: in the first cell, entering, by the terminal, the idle state from the RRC inactive state, or remaining in the RRC inactive state.

In some possible implementations, the fourth message is used to instruct the terminal to remain in the RRC inactive state, and the fourth message includes information about a second wireless network area in which the terminal is in the RRC inactive state and/or a security parameter that are/is determined by the third access network device.

In some possible implementations, before the sending, by a terminal, fourth information to a third access network device, the method further includes: determining, by the terminal, that there is an interface between the third access network device and a second access network device, where the second access network device is a serving access network device that is of the terminal in an RRC connected state before the terminal enters the RRC inactive state.

In some possible implementations, before the sending, by a terminal, fourth information to a third access network device, the method further includes: determining, by the terminal in the RRC inactive state, to switch to a first cell, where the first cell is not in the first wireless network area, and the third access network device is an access network device to which a cell in which the terminal is currently located belongs; the fourth message is used to instruct the terminal to enter the idle state from the RRC inactive state; and the entering, by the terminal, an idle state from the RRC inactive state includes: switching, by the terminal, to the first cell, and entering the idle state from the RRC inactive state.

In some possible implementations, before the sending, by a terminal, fourth information to a third access network device, the method further includes: determining, by the terminal, that there is no interface between a fourth access network device and a second access network device, where the fourth access network device is an access network device to which the first cell belongs, and the second access network device is a serving access network device that is of the terminal in an RRC connected state before the terminal enters the RRC inactive state.

In some possible implementations, after sending the fourth information, the terminal switches to the first cell, and enters the idle state from the RRC inactive state.

In some possible implementations, a cell change of the terminal may be a switch to a cell of a same standard, or may be a switch to a cell of a different standard. For example, the terminal switches from a cell of a 5G standard to another cell of the 5G standard through reselection, or switches from a cell of a 5G standard to a cell of an LTE standard through reselection.

In some possible implementations, the fourth information may carry a resume ID of the terminal.

In some possible implementations, the fourth information may also carry information about an anchor cell (or an anchor access network device) of the terminal that is in the RRC inactive state, for example, information about the second access network device.

In some possible implementations, the terminal may send the fourth information in the following manners.

After moving out of the first wireless network area, the terminal is not allowed to perform resume, in other words, resume to the RRC connected state. In a new cell, namely, the first cell, the terminal directly initiates new initial access, and adds information, such as a cause value, indicating a reason of initiating access, in other words, indicating that the terminal has moved out of the first wireless network area.

After moving out of the first wireless network area, the terminal still initiates a resume procedure, and adds information such as a cause value, namely, information indicating that the terminal has moved out of the first wireless network area. In other words, although the terminal is not allowed to perform resume, the terminal can send the fourth information to the third access network device in the resume procedure.

After moving out of the first wireless network area, the terminal uses a dedicated RRC message or procedure. The third access network device learns, based on a type of the RRC message, that the terminal has moved out of the first wireless network area.

In some possible implementations, the terminal may determine, in the following manners, whether there is an interface between two access network devices.

When inter-RAT cell reselection occurs, the terminal considers that there is no interface between a target access network device and an anchor access network device (the second access network device).

Alternatively, when the terminal enters the RRC inactive state, an anchor access network device adds configuration information to information indicating that the terminal enters the RRC inactive state. The configuration information is used by the terminal to determine whether there is an interface between a target access network device to which a target cell belongs and the anchor access network device during reselection. For example, the configuration information may include a list of cells with an interface or a list of cells without an interface.

In some possible implementations, when determining to switch to the first cell not in the first wireless network area, the terminal may directly switch to the first cell without notifying a network side, and enter the idle state. For the network side, if the network side does not receive any first information, sent by the terminal, all the time, the network side may release a stored context of the terminal after a validity period. In addition to the context of the terminal, the anchor access network device further releases a connection that corresponds to the terminal and that is between an access network and a core network.

According to a fifth aspect, a communication method is provided, including: receiving, by a third access network device, fourth information sent by a terminal, where the fourth information is used to indicate that the terminal has moved out of a first wireless network area in which the terminal is in a radio resource control RRC inactive state; and sending, by the third access network device, a fourth message to the terminal, where the fourth message is used to instruct the terminal to enter an idle state from the RRC inactive state or remain in the RRC inactive state.

In this embodiment of this application, the third access network device receives the fourth information sent by the terminal, and the fourth information indicates that the terminal has moved out of the first wireless network area in which the terminal is in the RRC inactive state. The fourth message is used to instruct the terminal to enter the idle state from the RRC inactive state or remains in the RRC inactive state. In this way, an RRC status of the terminal can be updated in a timely manner, the RRC status of the terminal can be flexibly configured, and an access network device in an original wireless network area can release a context of the terminal in a timely manner, so that service experience of the terminal can be improved, and performance of a communications system can be improved.

In some possible implementations, the third access network device is an access network device to which a first cell belongs, the first cell is not in the first wireless network area, and the first cell is a cell to which the terminal in the RRC inactive state changes.

In some possible implementations, the fourth message is used to instruct the terminal to enter the idle state from the RRC inactive state; and before the sending, by the third access network device, the fourth message to the terminal, the method further includes: sending, by the third access network device, fifth information to a second access network device, where the fifth information is used to indicate that the terminal has moved out of the first wireless network area, and the second access network device is a serving access network device that is of the terminal in an RRC connected state before the terminal enters the RRC inactive state.

The terminal is instructed to enter the idle state from the RRC inactive state, so that the terminal can be paged within a larger range.

In some possible implementations, the fourth message is used to instruct the terminal to remain in the RRC inactive state; and before the sending, by the third access network device, the fourth message to the terminal, the method further includes: sending, by the third access network device, fifth information to a second access network device, where the fifth information is used to indicate that the terminal has moved out of the first wireless network area, and to request a context of the terminal, and the second access network device is a serving access network device that is of the terminal in an RRC connected state before the terminal enters the RRC inactive state; and receiving, by the third access network device, a fifth message sent by the second access network device, where the fifth message includes the context of the terminal.

In some possible implementations, the method further includes: determining, by the third access network device, a second wireless network area in which the terminal is in the RRC inactive state and/or a security parameter, where the fourth message includes information about the second wireless network area and/or the security parameter.

In this way, the terminal can remain in the RRC inactive state in a new wireless network area, so that service experience of the terminal can be improved.

In some possible implementations, the method further includes: switching, by the third access network device, a connection that corresponds to the terminal and that is between an access network and a core network.

In some possible implementations, the third access network device is an access network device to which a cell in which the terminal is currently located belongs, the terminal determines to switch from the cell in which the terminal is currently located to a first cell, and the first cell is not in the first wireless network area; the fourth message is used to instruct the terminal to enter the idle state from the RRC inactive state; and before the sending, by the third access network device, the fourth message to the terminal, the method further includes: if the third access network device is a serving access network device that is of the terminal in an RRC connected state before the terminal enters the RRC inactive state, releasing, by the third access network device, a context of the terminal; or if the third access network device is not a serving access network device that is of the terminal in an RRC connected state before the terminal enters the RRC inactive state, sending, by the third access network device, fifth information to a second access network device, where the fifth information is used to indicate that the terminal has moved out of the first wireless network area, and the second access network device is the serving access network device that is of the terminal in the RRC connected state before the terminal enters the RRC inactive state.

In this way, a network side can release the context of the terminal in a timely manner, so that load on the network side is alleviated.

According to a sixth aspect, a communication method is provided, including: receiving, by a second access network device, fifth information sent by a third access network device, where the fifth information is used to indicate that a terminal has moved out of a first wireless network area in which the terminal is in a radio resource control RRC inactive state, and the second access network device is a serving access network device that is of the terminal in an RRC connected state before the terminal enters the RRC inactive state; and releasing, by the second access network device, a context of the terminal based on the fifth information.

In this embodiment of this application, the second access network device receives the fifth information sent by the third access network device. The fifth information indicates that the terminal has moved out of the first wireless network area in which the terminal is in the RRC inactive state. The second access network device releases the context of the terminal based on the fifth information. In this way, an RRC status of the terminal can be updated in a timely manner, and an access network device in an original wireless network area can release the context of the terminal in a timely manner, so that service experience of the terminal can be improved, and performance of a communications system can be improved.

In some possible implementations, the third access network device is an access network device to which a first cell belongs, the first cell is not in the first wireless network area, and the first cell is a cell to which the terminal in the RRC inactive state changes.

In some possible implementations, the fifth information is further used to request the context of the terminal; and the method further includes: sending, by the second access network device, a fifth message to the third access network device, where the fifth message includes the context of the terminal.

In some possible implementations, the third access network device is an access network device to which a cell in which the terminal is currently located belongs, the terminal determines to switch from the cell in which the terminal is currently located to the first cell, and the first cell is not in the first wireless network area.

In some possible implementations, the method further includes: releasing, by the second access network device, a connection that corresponds to the terminal and that is between the second access network device and a core network device.

In this way, a network side can release, in a timely manner, the context of the terminal and the connection that corresponds to the terminal and that is between an access network and a core network, so that load on the network side is alleviated.

According to a seventh aspect, a terminal is provided, including a module for performing the method in the first aspect or any possible implementation of the first aspect, or a module for performing the method in the fourth aspect or any possible implementation of the fourth aspect.

According to an eighth aspect, an access network device is provided, including a module for performing the method in the second aspect or any possible implementation of the second aspect, a module for performing the method in the third aspect or any possible implementation of the third aspect, a module for performing the method in the fifth aspect or any possible implementation of the fifth aspect, or a module for performing the method in the sixth aspect or any possible implementation of the sixth aspect.

According to a ninth aspect, a terminal is provided. The terminal includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the first aspect or any possible implementation of the first aspect, or the method in the fourth aspect or any possible implementation of the fourth aspect.

According to a tenth aspect, an access network device is provided. The access network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method in the second aspect or any possible implementation of the second aspect, the method in the third aspect or any possible implementation of the third aspect, the method in the fifth aspect or any possible implementation of the fifth aspect, or the method in the sixth aspect or any possible implementation of the sixth aspect.

According to an eleventh aspect, a computer readable storage medium is provided. The computer readable storage medium stores an instruction, and when the instruction runs on a computer, the computer is enabled to perform the method in any one of the foregoing aspects or the possible implementations of the foregoing aspects.

According to a twelfth aspect, a computer program product including an instruction is provided, and when the computer program product runs on a computer, the computer is enabled to perform the method in any one of the foregoing aspects or the possible implementations of the foregoing aspects.

DETAILED DESCRIPTION OF ILLUSTRATIVE EMBODIMENTS

The following describes technical solutions of this application with reference to the accompanying drawings.

Figure 1:
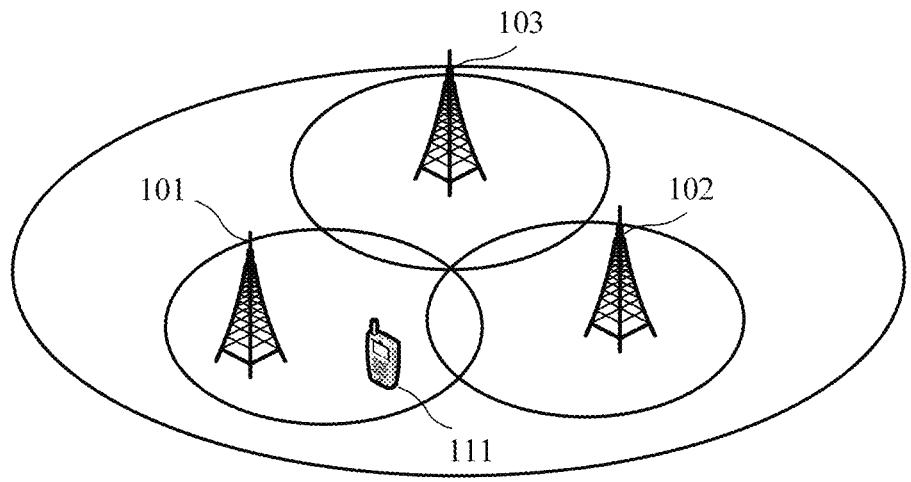
FIG. 1 is a schematic diagram of a network to which an embodiment of this application is applied.

FIG. 1 is a schematic diagram of a network to which an embodiment of this application is applied. As shown in FIG. 1, the network may include a plurality of access network devices, such as an access network device 101, an access network device 102, and an access network device 103. A current serving access network device of a terminal 111 is the access network device 101. The access network device 101 may configure, for the terminal 111, a wireless network area in which the terminal 111 is in an RRC inactive state. The wireless network area may be referred to as a radio access network—based notification area (RAN-based notification area, RNA). The access network device 101 may deliver information about the wireless network area to the terminal 111 by using dedicated signaling. The wireless network area may include one or more cells, for example, a cell of the access network device 101 and a cell of the access network device 102. The same as a terminal in an idle state, a terminal in the RRC inactive state performs cell reselection. When the terminal 111 in the RRC inactive state reselects a cell in the wireless network area, the terminal in does not notify the network. In other words, when the terminal in reselects a cell outside the wireless network area, the terminal in notifies the network. Therefore, when the terminal 111 entering the RRC inactive state needs to be paged, the terminal 111 may be paged in a cell in the wireless network area.

The terminal 111 may be located in the wireless network area for a long time, for example, may be always located in the cell of the access network device 101, or may move to the cell of the access network device 102. Alternatively, the terminal 111 may move out of the wireless network area, for example, move to a cell of the access network device 103.

It should be understood that only one terminal is used as an example for description in FIG. 1, but this embodiment of this application is not limited thereto.

In the technical solutions of this embodiment of this application, various cases of the terminal in the RRC inactive state are processed. When the terminal remains in the wireless network area in which the terminal is in the RRC inactive state, the RRC inactive state of the terminal can be kept, so that the terminal can quickly resume to a connected state when the terminal needs to enter the connected state. When the terminal has moved out of the wireless network area, an RRC status of the terminal can be flexibly configured, so that performance of a communications system is improved.

This specification describes the embodiments with reference to a terminal. The terminal may alternatively be a terminal device, user equipment (UE), an access terminal, a subscriber unit, a subscriber station, a mobile station, a mobile console, a remote station, a remote terminal, a mobile device, a user terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN).

This specification describes the embodiments with reference to an access network device. The access network device may alternatively be a network device. The network device may be a device configured to communicate with a terminal device. The network device may be a base transceiver station (BTS) in a GSM or CDMA, a NodeB (NB) in a WCDMA system, an evolved NodeB (eNB, or eNodeB) in an LTE system, or a wireless controller in a cloud radio access network (CRAN) scenario. Alternatively, the network device may be a relay node, an access point, an in-vehicle device, a wearable device, a network device in a future 5G network, a network device in a future evolved PLMN network, or the like.

It should be understood that in this specification, various information or message instruction manners may be an implicit instruction manner, or may be an explicit instruction manner. In the implicit instruction manner, a receive side performs a next action after receiving corresponding information or a corresponding message. In the explicit instruction manner, a receive side performs a next action according to an explicit instruction (for example, instruction information carried in information or a message).

Figure 2:
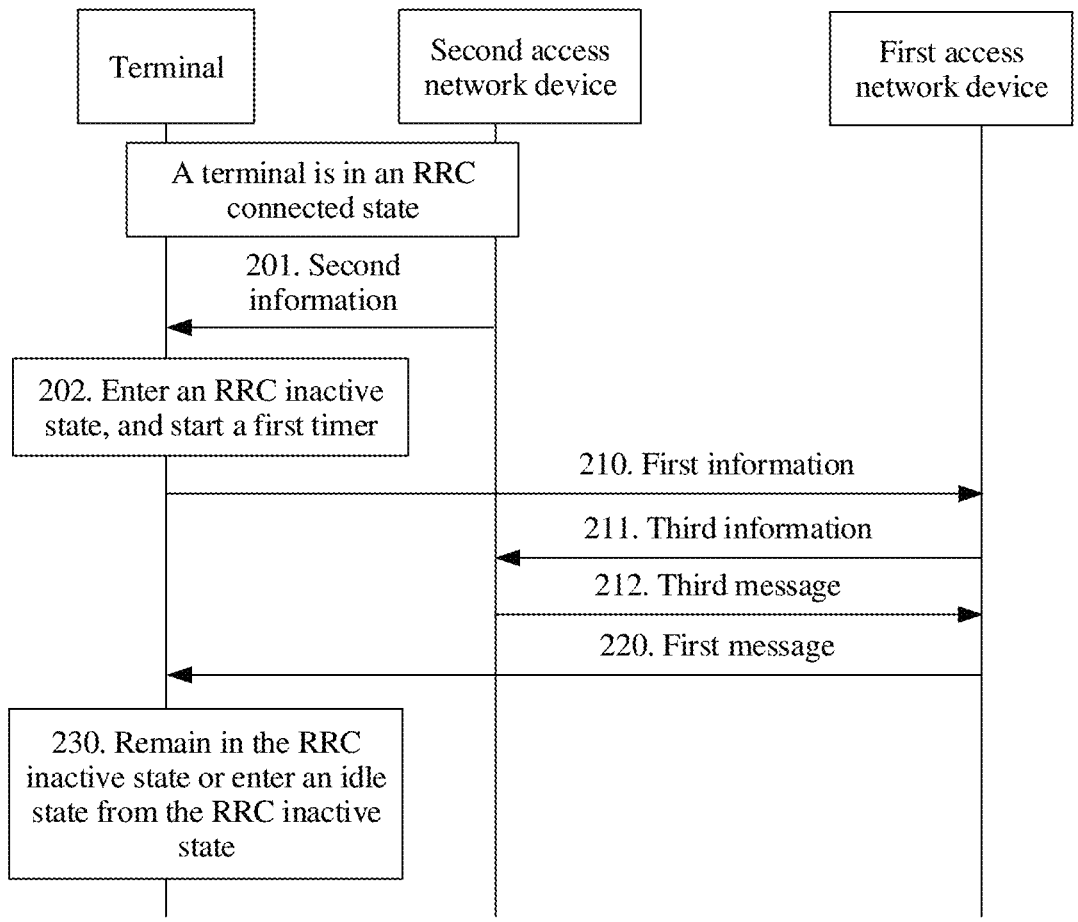
FIG. 2 is a schematic flowchart of a communication method according to an embodiment of this application.

FIG. 2 is a schematic flowchart of a communication method according to an embodiment of this application. In FIG. 2, a first access network device is an access network device to which a cell in which a terminal in an RRC inactive state is currently located belongs, and a second access network device is a serving access network device that is of the terminal in an RRC connected state before the terminal enters the RRC inactive state.

It should be understood that, in some cases, the first access network device and the second access network device may be a same access network device. When the first access network device and the second access network device are the same access network device, the first access network device and the second access network device no longer need to exchange data in all accompanying drawings in this specification. For brevity of description, this specification does not provide new accompanying drawings. FIG. 1 is used as an example. If the terminal 111 is always located in the cell of the access network device 101, for the terminal 111, the first access network device and the second access network device are a same access network device, namely, the access network device 101. If the terminal 111 moves to the cell of the access network device 102, for the terminal 101, the first access network device is the access network device 102, and the second access network device is the access network device 101.

210. The terminal in an RRC inactive state sends first information to the first access network device, where the first information is used to indicate that the terminal is located in a wireless network area in which the terminal is in the RRC inactive state.

Specifically, if the terminal in the RRC inactive state camps on a cell in the wireless network area, the terminal may periodically or aperiodically send the first information to an access network device in the cell on which the terminal currently camps, to indicate that the terminal remains in the wireless network area. In this way, a network side can determine that the terminal remains in the wireless network area, so that the network side may continue to store a context of the terminal, and the terminal may continue to remain in the inactive state.

After receiving the first information, the first access network device learns that the terminal remains in the wireless network area, and may determine to continue to keep the terminal in the RRC inactive state or make the terminal enter an idle state from the RRC inactive state. Optionally, the first access network device may determine, based on a network status, whether to continue to keep the terminal in the RRC inactive state.

Optionally, an interval at which the terminal sends the first information may be based on a timer. The terminal may send the first information to the first access network device when the timer expires. Optionally, as shown in FIG. 2, step 201 and step 202 may be first performed before step 210.

201. The terminal in an RRC connected state receives second information sent by the second access network device, where the second information is used to instruct the terminal to enter the RRC inactive state from the RRC connected state.

The second access network device sends the second information to the terminal in the RRC connected state, to instruct the terminal to enter the RRC inactive state from the RRC connected state.

202. The terminal enters the RRC inactive state from the RRC connected state based on the second information, and starts a first timer based on the second information.

In this case, the terminal sends the first information to the first access network device when the first timer expires.

Optionally, duration of the first timer may be determined by the terminal. For example, the second information may indicate a first validity period. After receiving the second information, the terminal starts the first timer. The duration of the first timer is shorter than the first validity period. The validity period may be a validity period in which the terminal can resume to the RRC connected state.

Optionally, duration of the first timer may be determined by the second access network device. For example, the second information may indicate first timer duration. After receiving the second information, the terminal starts the first timer. The duration of the first timer is the first timer duration.

It should be understood that the duration of the timer may alternatively be determined in another manner, for example, a preconfiguration manner or an agreed-on manner. This is not limited in this embodiment of this application.

Optionally, the first information may be sent in a random access process without a need for a process such as establishing an RRC connection or setting up a bearer; or the terminal sends the first information on a shared resource through contention.

Optionally, the first information may be RRC resume request (RRC resume request) information. Different from common RRC resume request information, the first information carries information (for example, a cause value) indicating that "the terminal is in the wireless network area." The access network device learns, based on the information, that the terminal does not need to enter the connected state, and therefore the process such as establishing an RRC connection or setting up a bearer is not required.

Optionally, the first information may alternatively be newly introduced signaling information. An implementation of the first information is not limited in this embodiment of this application.

Optionally, if the first access network device does not receive any first information of the terminal all the time, the first access network device may release a stored context of the terminal after a validity period. For example, the validity period may be a validity period in which the terminal can resume to the RRC connected state.

220. The terminal receives a first message sent by the first access network device.

The first message is used to instruct the terminal to remain in the RRC inactive state or enter the idle state from the RRC inactive state.

Optionally, the first message carries no instruction information. In this case, after receiving the first message, the terminal remains in the RRC inactive state.

Optionally, the first message carries instruction information, and the instruction information instructs the terminal to remain in the RRC inactive state or enter the idle state from the RRC inactive state. In other words, the network side can control an RRC status of the terminal, and indicate the RRC status of the terminal. Optionally, when the RRC inactive state of the terminal is to be kept, an implicit instruction (in other words, no instruction information is carried) may be used, or an explicit instruction (in other words, instruction information is carried) may be used. When the RRC inactive state of the terminal is not to be kept, an explicit instruction may be used. However, this is not limited in this embodiment of this application.

As described above, after receiving the first information, the first access network device may determine to continue to keep the terminal in the RRC inactive state or make the terminal enter the idle state from the RRC inactive state. The first access network device sends the first message to the terminal, and the first message is used to instruct the terminal to remain in the RRC inactive state or enter the idle state from the RRC inactive state.

If the first access network device determines to continue to keep the terminal in the RRC inactive state, the first access network device sends the first message, to instruct the terminal to remain in the RRC inactive state. Optionally, if the first access network device stores the context of the terminal, the first access network device may reset a validity period of the context of the terminal. Specifically, when the terminal enters the RRC inactive state from the RRC connected state, the second access network device stores the context of the terminal. In addition, the second access network device may further send the context of the terminal to another access network device in the wireless network area. In other words, if the first access network device is the serving access network device that is of the terminal in the RRC connected state before the terminal enters the RRC inactive state, the first access network device stores the context of the terminal. If the first access network device is not the serving access network device that is of the terminal in the RRC connected state before the terminal enters the RRC inactive state, the first access network device may also store the context of the terminal. When determining to continue to keep the terminal in the RRC inactive state, the first access network device may reset the validity period of the context of the terminal, and send the first message used to instruct the terminal to remain in the RRC inactive state.

Optionally, when the first message is used to instruct the terminal to remain in the RRC inactive state, the first message is further used to instruct the terminal to restart the first timer, or the first message is further used to instruct the terminal to start a second timer. When used to instruct the terminal to start the second timer, the first message may include a second validity period or second timer duration, and duration of the second timer is shorter than the second validity period or duration of the second timer is the second timer duration.

Optionally, if the first access network device determines not to keep the terminal in the RRC inactive state any more, the first access network device sends the first message, to instruct the terminal to enter the idle state from the RRC inactive state. In this case, if the first access network device stores the context of the terminal, the first access network device may release the context of the terminal. In this case, optionally, the first access network device may further send information to another access network device in the wireless network area, to instruct the another access network device to release the context of the terminal.

Optionally, if the first access network device is not the serving access network device that is of the terminal in the RRC connected state before the terminal enters the RRC inactive state, step 211 and step 212 may be further performed.

211. The first access network device sends third information to the second access network device, where the third information is used to indicate that the terminal is located in the wireless network area.

212. The first access network device receives the third message sent by the second access network device, where the third message is used to instruct the terminal to remain in the RRC inactive state or enter an idle state from the RRC inactive state.

Because the second access network device is the serving access network device that is of the terminal in the RRC connected state before the terminal enters the RRC inactive state, the second access network device stores the context of the terminal. If the first access network device is not the serving access network device that is of the terminal in the RRC connected state before the terminal enters the RRC inactive state, after the first access network device receives the first information, the first access network device sends the third information to the second access network device. In this case, the second access network device may determine to continue to keep the terminal in the RRC inactive state or make the terminal enter the idle state from the RRC inactive state, and send the third message to the first access network device, to instruct the terminal to remain in the RRC inactive state or enter the idle state from the RRC inactive state. Optionally, when the third message is used to instruct the terminal to remain in the RRC inactive state, the second access network device resets the validity period of the context of the terminal. When the third message is used to instruct the terminal to enter the idle state from the RRC inactive state, the second access network device releases the context of the terminal, and releases a connection that corresponds to the terminal and that is between an access network and a core network.

Optionally, the third information carries an identity (i ID) of the terminal. The ID is an ID of the terminal in the RRC inactive state, and for example, may be referred to as a resume ID. Although configuration (including a cell list, an access network device list, or an access network area identifier list) of the wireless network area in which the terminal is located is terminal-specific, an assigned resume ID needs to be unique within a fixed range. Optionally, the resume ID may be assigned according to the following method: In this fixed range, an access network device is fixedly used as a resume ID assigner; when an interface (Xn interface) between base stations is being established, the assigner assigns a resume ID range available to each access network device; and when an access network device considers that the access network device needs to obtain more resume IDs, the access network device may apply to the assigner for more resume IDs. Optionally, an additional entity may be responsible for resume ID assignment. This is not limited in this embodiment of this application.

Optionally, when the third message is used to instruct the terminal to remain in the RRC inactive state, the third message is further used to instruct the terminal to restart the first timer; or the third message is further used to instruct the terminal to start the second timer, where the third message includes the second validity period or the second timer duration, and the duration of the second timer is shorter than the second validity period or the duration of the second timer is the second timer duration.

Optionally, when step 211 and step 212 are performed, the first access network device may send the first message to the terminal based on the third message.

It should be understood that, if the first access network device is not the serving access network device that is of the terminal in the RRC connected state before the terminal enters the RRC inactive state, whether to continue to keep the terminal in the RRC inactive state may be determined by the first access network device, or may be determined by the second access network device. In addition, when determining to continue to keep the terminal in the RRC inactive state, an access network device may send information to another access network device in the wireless network area, to instruct the another access network device to reset the validity period of the context of the terminal. When determining not to keep the terminal in the RRC inactive state any more, an access network device may send information to another access network device in the wireless network area, to instruct the another access network device to release the context of the terminal.

230. The terminal remains in the RRC inactive state based on the first message, or enters the idle state from the RRC inactive state based on the first message.

If the first message is used to instruct the terminal to remain in the RRC inactive state, the terminal remains in the RRC inactive state. Optionally, if the first message includes no new validity period or new timer duration, the terminal may restart the first timer when receiving the first message. If the first message includes a new validity period or new timer duration, for example, the second validity period or the second timer duration, the terminal may start the second timer when receiving the first message. The duration of the second timer is shorter than the second validity period or the duration of the second timer is the second timer duration.

If the first message is used to instruct the terminal to enter the idle state from the RRC inactive state, the terminal releases the context of the terminal, and enters the idle state from the RRC inactive state.

Optionally, if the terminal does not receive the first message within a specific time period, the terminal may release the context of the terminal, and enters the idle state from the RRC inactive state.

Optionally, in an embodiment of this application, the terminal in the RRC inactive state sends no tracking area update (1 TAU) message to the core network. The terminal in the idle state periodically sends a non-access stratum (1 NAS) message to the core network, and the NAS message is a TAU message. However, for the terminal entering the RRC inactive state, because an access network device does not notify the core network that the terminal enters the RRC inactive state, the connection that corresponds to the terminal and that is between the access network and the core network is still reserved. Therefore, the terminal in the RRC inactive state sends no TAU message to the core network, to prevent the core network from considering that the terminal encounters an error (the terminal in the connected state should not send a TAU message) and consequently releasing the connection corresponding to the terminal.

In this embodiment of this application, the terminal sends the first information to the first access network device, to indicate that the terminal is located in the wireless network area in which the terminal is in the RRC inactive state. In this way, an RRC status of the terminal on a network side keeps consistent with an RRC status of the terminal on a terminal side, so that the RRC status of the terminal can be effectively configured and a stored context of the terminal can be effectively processed, thereby improving performance of a communications system.

The foregoing describes a case in which the terminal remains in the wireless network area in which the terminal is in the RRC inactive state. The following describes a case in which the terminal has moved out of the wireless network area.

If the terminal has moved out of the wireless network area, the terminal sends information to a network side. The information may be sent to an access network device to which a cell not in the wireless network area after a cell change belongs, or may be sent to an access network device to which a cell in the wireless network area before a cell change belongs. The following separately provides description.

Figure 3:
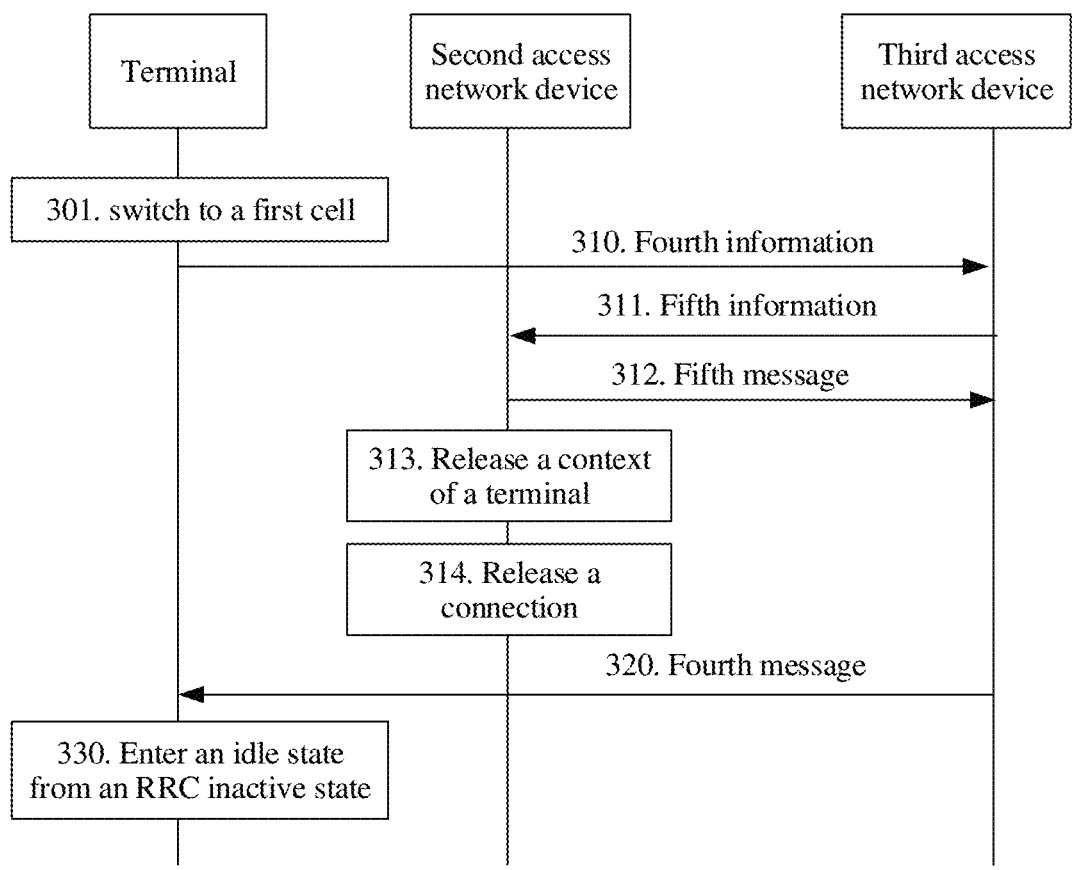
FIG. 3 is a schematic flowchart of a communication method according to another embodiment of this application.

FIG. 3 is a schematic flowchart of a communication method according to another embodiment of this application. In FIG. 3, a second access network device is a serving access network device of the terminal in an RRC connected state before the terminal enters an RRC inactive state, a third access network device is an access network device to which a first cell to which the terminal in the RRC inactive state changes belongs, and the first cell is not in a first wireless network area in which the terminal is in the radio resource control RRC inactive state.

310. The terminal sends fourth information to the third access network device, where the fourth information is used to indicate that the terminal has moved out of a first wireless network area in which the terminal is in a radio resource control RRC inactive state.

When the terminal switches to a cell outside the first wireless network area, the terminal notifies a network side that the terminal has moved out of the first wireless network area. For example, the terminal in the RRC inactive state switches to the cell outside the first wireless network area through cell reselection. In other words, as shown in FIG. 3, step 301 may be first performed before step 310.

301. The terminal in the RRC inactive state switches to a first cell.

The first cell is not in the first wireless network area. In this case, the terminal may send the fourth information to the third access network device, to notify the network side that the terminal has moved out of the first wireless network area.

Optionally, a cell change of the terminal may be a switch to a cell of a same standard, or may be a switch to a cell of a different standard. For example, the terminal switches from a cell of a 5G standard to another cell of the 5G standard through reselection, or switches from a cell of a 5G standard to a cell of an LTE standard through reselection.

Optionally, the fourth information may carry a resume ID of the terminal.

Optionally, the fourth information may also carry information about an anchor cell (or an anchor access network device) of the terminal that is in the RRC inactive state, for example, information about the second access network device. The anchor cell (or the anchor access network device) is a cell (or an access network device) of the terminal when the terminal enters the RRC inactive state, or a cell (or an access network device) that communicates with the terminal last time, and is used by a current access network device to notify the anchor access network device that the terminal has moved to the current access network device.

Optionally, the terminal may send the fourth information in the following manners.

After moving out of the first wireless network area, the terminal is not allowed to perform resume, in other words, resume to the RRC connected state. In a new cell, namely, the first cell, the terminal directly initiates new initial access, and adds information, such as a cause value, indicating a reason of initiating access, in other words, indicating that the terminal has moved out of the first wireless network area.

After moving out of the first wireless network area, the terminal still initiates a resume procedure, and adds information such as a cause value, namely, information indicating that the terminal has moved out of the first wireless network area. In other words, although the terminal is not allowed to perform resume, the terminal can send the fourth information to the third access network device in the resume procedure.

After moving out of the first wireless network area, the terminal uses a dedicated RRC message or procedure. The third access network device learns, based on a type of the RRC message, that the terminal has moved out of the first wireless network area.

It should be understood that the foregoing manners are merely examples, and the fourth information may alternatively be sent in another manner. An implementation of the fourth information is not limited in this embodiment of this application.

320. The terminal receives a fourth message sent by the third access network device.

The fourth message is used to instruct the terminal to enter an idle state from the RRC inactive state.

Optionally, the fourth message may use an implicit instruction manner, and after receiving the fourth message, the terminal always enters the idle state. Alternatively, the fourth message may use an explicit instruction manner, and the terminal enters the idle state according to an explicit instruction.

Figure 4:
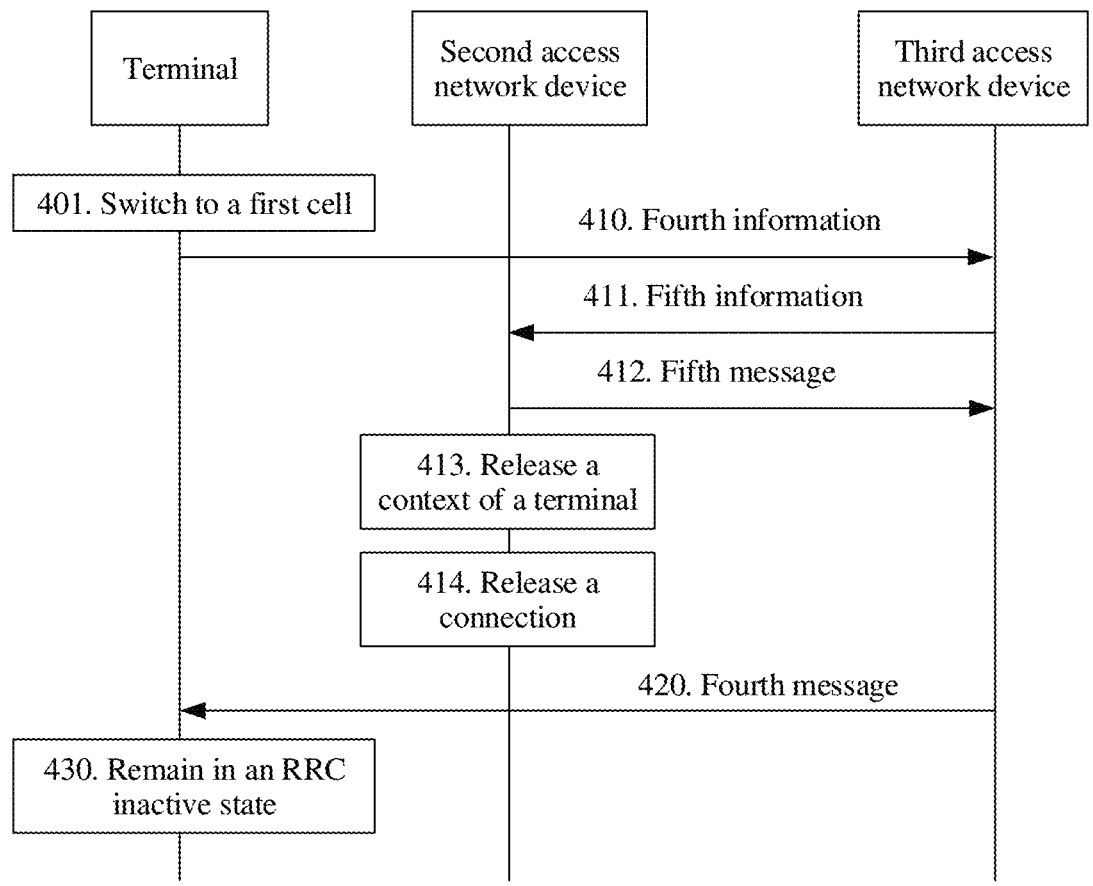
FIG. 4 is a schematic flowchart of a communication method according to still another embodiment of this application.

After receiving the fourth information sent by the terminal, the third access network device learns that the terminal has moved out of the first wireless network area, and may determine to make the terminal enter the idle state from the RRC inactive state or continue to keep the terminal in the RRC inactive state. FIG. 3 shows a case of making the terminal enter the idle state from the RRC inactive state. The following FIG. 4 shows a case of continuing to keep the terminal in the RRC inactive state.

Because the terminal has moved out of the first wireless network area, configuration of the first wireless network area is no longer valid. The third access network device may send notification information to the serving access network device, namely, the second access network device, that is of the terminal in the RRC connected state before the terminal enters the RRC inactive state. Optionally, as shown in FIG. 3, step 311 to step 314 may be first performed before step 320.

311. The third access network device sends fifth information to the second access network device, where the fifth information is used to indicate that the terminal has moved out of the first wireless network area.

312. The third access network device receives a fifth message sent by the second access network device.

313. The second access network device releases a context of the terminal.

314. The second access network device releases a connection that corresponds to the terminal and that is between the second access network device and a core network device.

The third access network device notifies, by using the fifth information, the second access network device that the terminal has moved out of the first wireless network area. After receiving the fifth information sent by the third access network device, the second access network device learns that the terminal has moved out of the first wireless network area. Therefore, the second access network device releases the context of the terminal, and releases the connection that corresponds to the terminal and that is between the second access network device and the core network device. Optionally, the second access network device may further send information to another access network device in the first wireless network area, to instruct the another access network device to release the context of the terminal. In addition, the second access network device may further send the fifth message to the third access network device.

330. The terminal enters an idle state from the RRC inactive state based on the fourth message.

After receiving the fourth message used to instruct the terminal to enter the idle state from the RRC inactive state, the terminal releases the context of the terminal, and enters the idle state in the first cell.

In the foregoing process, the third access network device sets up no data bearer for the terminal, and resumes no RRC connection of the terminal. In other words, after moving out of the first wireless network area, the terminal enters the idle state from the RRC inactive state.

In this embodiment of this application, the terminal sends the fourth information to the third access network device, to indicate that the terminal has moved out of the first wireless network area in which the terminal is in the RRC inactive state. In addition, the terminal enters the idle state from the RRC inactive state based on the fourth message sent by the third access network device. In this way, an RRC status of the terminal can be updated in a timely manner, and the terminal can be paged within a larger range. In addition, the network side can release the context of the terminal in a timely manner, so that load on the network side is alleviated. Therefore, service experience of the terminal can be improved, and performance of a communications system can be improved.

Optionally, the third access network device may determine, based on a network status, for example, a condition such as load of the third access network device, to continue to keep the terminal in the RRC inactive state. In this case, the third access network device may re-determine a wireless network area, namely, a second wireless network area, in which the terminal is in the RRC inactive state. The following provides description with reference to FIG. 4.

FIG. 4 is a schematic flowchart of a communication method according to still another embodiment of this application. Except for the following description, for other description of the embodiment shown in FIG. 4, refer to the embodiment shown in FIG. 3. For brevity, details are not described below.

For description of step 410 and step 401 in FIG. 4, refer to corresponding description in the embodiment shown in FIG. 3. For brevity, details are not described again.

420. A terminal receives a fourth message sent by a third access network device.

The fourth message is used to instruct the terminal to remain in the RRC inactive state.

After receiving the fourth information sent by the terminal, the third access network device learns that the terminal has moved out of the first wireless network area, and may determine to make the terminal enter an idle state from the RRC inactive state or continue to keep the terminal in the RRC inactive state. In this embodiment, the third access network device determines, based on a network status, for example, a condition such as load of the third access network device, to continue to keep the terminal in the RRC inactive state.

Because the terminal has moved out of the first wireless network area, configuration of the first wireless network area is no longer valid. The third access network device may send notification information to the serving access network device, namely, the second access network device, that is of the terminal in the RRC connected state before the terminal enters the RRC inactive state. In addition, to continue to keep the terminal in the RRC inactive state, the third access network device may request a context of the terminal from the second access network device. Optionally, as shown in FIG. 4, step 411 to step 414 may be first performed before step 420.

411. The third access network device sends fifth information to the second access network device, where the fifth information is used to indicate that the terminal has moved out of the first wireless network area and to request a context of the terminal.

412. The third access network device receives the fifth message sent by the second access network device, where the fifth message includes the context of the terminal.

413. The second access network device releases the context of the terminal.

414. The third access network device switches a connection that corresponds to the terminal and that is between an access network and a core network.

The third access network device notifies, by using the fifth information, the second access network device that the terminal has moved out of the first wireless network area, and requests the context of the terminal by using the fifth information. After receiving the fifth information sent by the third access network device, the second access network device learns that the terminal has moved out of the first wireless network area, sends the context of the terminal to the third access network device, and releases the context of the terminal. Optionally, the second access network device may further send information to another access network device in the first wireless network area, to instruct the another access network device to release the context of the terminal. After receiving the fifth message of the second access network device, the third access network device switches the connection (for example, an S1 connection) that corresponds to the terminal and that is between the access network and the core network, in other words, switches an access network end of the connection from the second access network device to the third access network device.

Optionally, the third access network device may further determine a security parameter and/or a second wireless network area in which the terminal is in the RRC inactive state, and add information about the second wireless network area and/or the security parameter to the fourth message sent to the terminal.

430. The terminal remains in the RRC inactive state based on the fourth message.

After receiving the fourth message used to instruct the terminal to remain in the RRC inactive state, the terminal remains in the RRC inactive state in the first cell based on the fourth message. For example, the terminal remains in the RRC inactive state based on the second wireless network area.

In this embodiment of this application, the terminal sends the fourth information to the third access network device, to indicate that the terminal has moved out of the first wireless network area in which the terminal is in the RRC inactive state. In addition, the terminal remains in the RRC inactive state based on the fourth message sent by the third access network device. In this way, the terminal can remain in the RRC inactive state in a new wireless network area, and an access network device in an original wireless network area can release the context of the terminal in a timely manner, so that service experience of the terminal can be improved, and performance of a communications system can be improved.

In the embodiments shown in FIG. 3 and FIG. 4, the terminal sends the fourth information to an access network device to which a cell obtained through a cell change belongs, and then the access network device sends the fifth information to an original serving access network device of the terminal. In this case, the terminal may first determine that there is an interface between the two access network devices, and then send the information. In other words, in the embodiments shown in FIG. 3 and FIG. 4, the terminal may first determine that there is an interface between the third access network device and the second access network device, then switch to the first cell, and send the fourth information to the third access network device.

Optionally, if there is no interface between the access network device to which the cell to which the terminal changes belongs and the original serving access network device, for example, the access network devices belong to different standards and there is no direct interface, before a cell change, the terminal may send notification information to an access network device to which a cell in which the terminal is currently located belongs. The following provides description with reference to FIG. 5. It should be understood that, except for the following description, for other description of the embodiment shown in FIG. 5, refer to the foregoing embodiments. For brevity, details are not described below.

Figure 5:
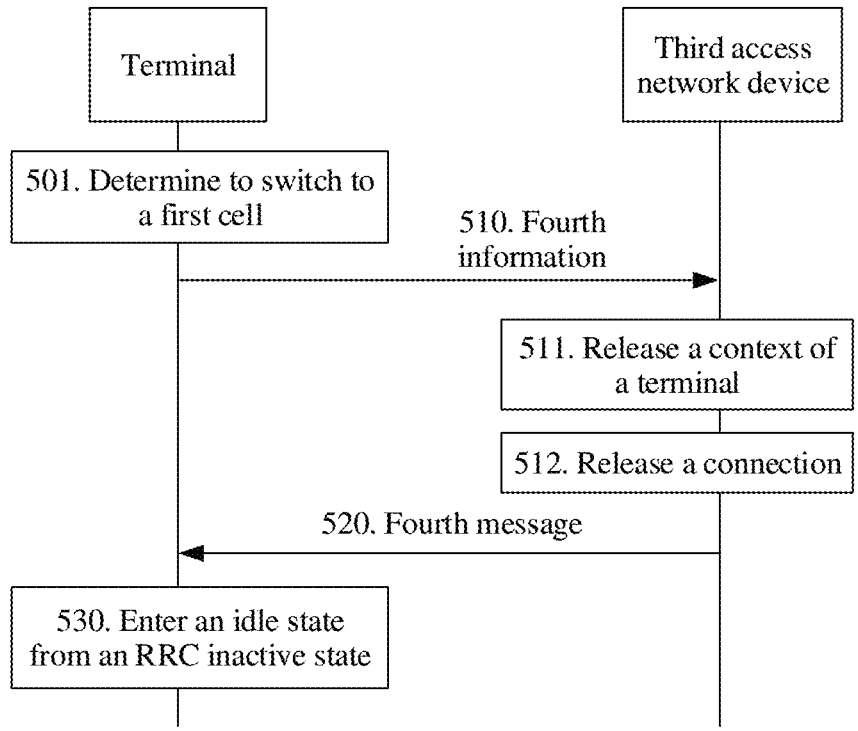
FIG. 5 is a schematic flowchart of a communication method according to still another embodiment of this application.

FIG. 5 is a schematic flowchart of a communication method according to still another embodiment of this application. In FIG. 5, a second access network device is a serving access network device that is of the terminal in an RRC connected state before the terminal enters an RRC inactive state, and a third access network device is an access network device to which a cell (a cell on which the terminal camps) in which the terminal in the RRC inactive state is currently located belongs before a cell change.

510. The terminal sends fourth information to the third access network device, where the fourth information is used to indicate that the terminal has moved out of a first wireless network area in which the terminal is in a radio resource control RRC inactive state.

When the terminal determines to switch to a first cell not in the first wireless network area, the terminal notifies a network side that the terminal has moved out of the first wireless network area. For example, the terminal in the RRC inactive state needs to perform cell reselection, to switch to the first cell outside the first wireless network area. In other words, as shown in FIG. 5, step 501 may be first performed before step 510.

501. The terminal in the RRC inactive state determines to switch to the first cell.

The first cell is not in the first wireless network area. In this case, the terminal may send the fourth information to the access network device, namely, the third access network device, to which the cell in which the terminal is currently located belongs, to notify the network side that the terminal has moved out of the first wireless network area.

Optionally, before switching to the first cell, the terminal may determine whether there is an interface between a fourth access network device and the second access network device. The fourth access network device is an access network device to which the first cell belongs. When determining that there is no interface between the fourth access network device and the second access network device, the terminal sends the fourth information to the third access network device.

Optionally, the terminal may determine, in the following manners, whether there is an interface between two access network devices.

When inter-RAT cell reselection occurs, the terminal considers that there is no interface between a target access network device and an anchor access network device (the second access network device).

Alternatively, when the terminal enters the RRC inactive state, an anchor access network device adds configuration information to information indicating that the terminal enters the RRC inactive state. The configuration information is used by the terminal to determine whether there is an interface between a target access network device to which a target cell belongs and the anchor access network device during reselection. For example, the configuration information may include a list of cells with an interface or a list of cells without an interface.

It should be understood that the foregoing manners are merely examples, and whether there is an interface between two access network devices may alternatively be determined in another manner. This is not limited in this embodiment of this application.

Optionally, after sending the fourth information, the terminal switches to the first cell, and enters an idle state from the RRC inactive state. Alternatively, the terminal performs the following step to receive a fourth message.

520. The terminal receives a fourth message sent by the third access network device.

The fourth message is used to instruct the terminal to enter the idle state from the RRC inactive state. The fourth message may use an implicit instruction manner, or may use an explicit instruction manner.

After receiving the fourth information sent by the terminal, the third access network device learns that the terminal has moved out of the first wireless network area. If the third access network device stores a context of the terminal, the third access network device may release the context of the terminal.

Optionally, if the third access network device is the serving access network device that is of the terminal in the RRC connected state before the terminal enters the RRC inactive state, as shown in FIG. 5, step 511 and step 512 may be first performed before step 520.

511. The third access network device releases a context of the terminal.

512. The third access network device releases a connection that corresponds to the terminal and that is between an access network and a core network.

Optionally, the third access network device may further send information to another access network device in the first wireless network area, to instruct the another access network device to release the context of the terminal.

Optionally, if the third access network device is not the serving access network device that is of the terminal in the RRC connected state before the terminal enters the RRC inactive state, the third access network device sends fifth information to the second access network device, namely, the serving access network device that is of the terminal in the RRC connected state before the terminal enters the RRC inactive state. The fifth information is used to indicate that the terminal has moved out of the first wireless network area.

The third access network device notifies, by using the fifth information, the second access network device that the terminal has moved out of the first wireless network area. After receiving the fifth information sent by the third access network device, the second access network device learns that the terminal has moved out of the first wireless network area. Therefore, the second access network device releases the context of the terminal, and releases the connection that corresponds to the terminal and that is between the access network and the core network. Optionally, the second access network device may further send information to another access network device in the first wireless network area, to instruct the another access network device to release the context of the terminal. In addition, the second access network device may further send a fifth message to the third access network device.

530. The terminal enters an idle state from the RRC inactive state.

After receiving the fourth message, the terminal switches to the first cell, and enters the idle state from the RRC inactive state.

In this embodiment of this application, the terminal sends the fourth information to the third access network device, to indicate that the terminal has moved out of the first wireless network area in which the terminal is in the RRC inactive state. In addition, the terminal enters the idle state from the RRC inactive state based on the fourth message sent by the third access network device. In this way, an RRC status of the terminal can be updated in a timely manner, and the terminal can be paged within a larger range. In addition, the network side can release the context of the terminal in a timely manner, so that load on the network side is alleviated. Therefore, service experience of the terminal can be improved, and performance of a communications system can be improved.

Optionally, when determining to switch to the first cell not in the first wireless network area, the terminal may directly switch to the first cell without notifying the network side, and enter the idle state. For the network side, if the network side does not receive any first information, sent by the terminal, all the time, the network side may release the stored context of the terminal after a validity period. In addition to the context of the terminal, the anchor access network device further releases the connection that corresponds to the terminal and that is between the access network and the core network.

It should be understood that various implementations described in this specification may be implemented separately or in combination. This is not limited in the embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that specific examples in the embodiments of this application are merely intended to help a person skilled in the art better understand the embodiments of this application, but are not intended to limit the scope of the embodiments of this application.

The foregoing describes the communication methods in the embodiments of this application in detail, and the following describes an access network device and a terminal in the embodiments of this application. It should be understood that the access network device and the terminal in the embodiments of this application can perform the foregoing methods in the embodiments of this application. In other words, for a specific working process of the following devices, refer to a corresponding process in the foregoing method embodiments.

Figure 6:
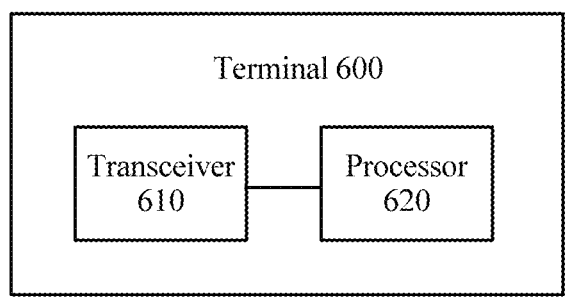
FIG. 6 is a schematic block diagram of a terminal according to an embodiment of this application.

FIG. 6 is a schematic block diagram of a terminal 600 according to an embodiment of this application. The terminal 600 may be the terminal in the foregoing method embodiments. As shown in FIG. 6, the terminal 600 includes: a transceiver 610, configured to: send, in a radio resource control RRC inactive state, first information to a first access network device, where the first information is used to indicate that the terminal is located in a wireless network area in which the terminal is in the RRC inactive state, and the first access network device is an access network device to which a cell in which the terminal is currently located belongs; and receive a first message sent by the first access network device; and a processor 620, configured to: keep the terminal 600 in the RRC inactive state based on the first message, or make the terminal 600 enter an idle state from the RRC inactive state based on the first message.

Optionally, the transceiver 610 is further configured to receive, in an RRC connected state, second information sent by a second access network device, where the second information is used to instruct the terminal to enter the RRC inactive state from the RRC connected state, and the second access network device is a serving access network device that is of the terminal in the RRC connected state before the terminal enters the RRC inactive state.

The processor 620 is further configured to: make the terminal 600 enter the RRC inactive state from the RRC connected state based on the second information, and start a first timer based on the second information.

The transceiver 610 is specifically configured to send the first information to the first access network device when the first timer expires.

Optionally, the second information further indicates a first validity period or first timer duration, and duration of the first timer is shorter than the first validity period or duration of the first timer is the first timer duration.

Optionally, the first message is used to instruct the terminal to remain in the RRC inactive state.

The processor 620 is further configured to restart the first timer when the first message is received.

Optionally, the first message is used to instruct the terminal to remain in the RRC inactive state, and the first message includes a second validity period or second timer duration.

The processor 620 is further configured to start a second timer when the first message is received, where duration of the second timer is shorter than the second validity period or duration of the second timer is the second timer duration.

The terminal 600 in this embodiment of this application may correspond to the terminal in the communication methods in the embodiments of this application, and the foregoing and other operations and/or functions of modules of the terminal 600 are separately configured to implement corresponding procedures of the methods. For brevity, details are not described herein again.

Figure 7:
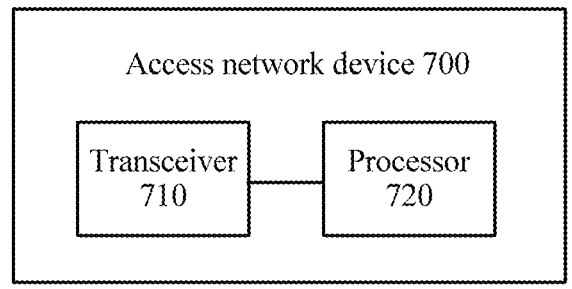
FIG. 7 is a schematic block diagram of an access network device according to an embodiment of this application.

FIG. 7 is a schematic block diagram of an access network device 700 according to an embodiment of this application. The access network device 700 may be an access network device such as the first access network device in the foregoing method embodiments. As shown in FIG. 7, the access network device 700 includes: a transceiver 710, configured to receive first information sent by a terminal in a radio resource control RRC inactive state, where the first information is used to indicate that the terminal is located in a wireless network area in which the terminal is in the RRC inactive state, and the access network device is an access network device to which a cell in which the terminal is currently located belongs; and a processor 720, configured to generate a first message, where the first message is used to instruct the terminal to remain in the RRC inactive state or enter an idle state from the RRC inactive state.

The transceiver 710 is further configured to send the first message to the terminal.

Optionally, the first message is used to instruct the terminal to remain in the RRC inactive state.

The processor 720 is further configured to reset a validity period of a context of the terminal.

Optionally, the first information is sent by the terminal when a first timer expires; and when the first message is used to instruct the terminal to remain in the RRC inactive state, the first message is further used to instruct the terminal to restart the first timer; or the first message is further used to instruct the terminal to start a second timer, where the first message includes a second validity period or second timer duration, and duration of the second timer is shorter than the second validity period or duration of the second timer is the second timer duration.

Optionally, the access network device is not a serving access network device that is of the terminal in an RRC connected state before the terminal enters the RRC inactive state.

The transceiver 710 is configured to: send third information to a second access network device, where the third information is used to indicate that the terminal is located in the wireless network area, and the second access network device is the serving access network device that is of the terminal in the RRC connected state before the terminal enters the RRC inactive state; receive the third message sent by the second access network device, where the third message is used to instruct the terminal to remain in the RRC inactive state or enter the idle state from the RRC inactive state; and send the first message to the terminal based on the third message.

The access network device 700 in this embodiment of this application may correspond to the first access network device in the communication methods in the embodiments of this application, and the foregoing and other operations and/or functions of modules of the access network device 700 are separately configured to implement corresponding procedures of the methods. For brevity, details are not described herein again.

Figure 8:
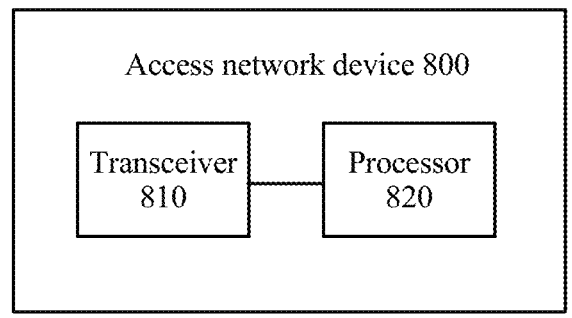
FIG. 8 is a schematic block diagram of an access network device according to another embodiment of this application.

FIG. 8 is a schematic block diagram of an access network device 800 according to another embodiment of this application. The access network device 800 may be an access network device such as the second access network device in the foregoing method embodiments. As shown in FIG. 8, the access network device 800 includes: a transceiver 810, configured to receive third information sent by a first access network device, where the third information is used to indicate that a terminal is located in a wireless network area in which the terminal is in a radio resource control RRC inactive state, the access network device is a serving access network device that is of the terminal in an RRC connected state before the terminal enters the RRC inactive state, and the first access network device is an access network device to which a cell in which the terminal is currently located belongs; and a processor 820, configured to generate a third message, where the third message is used to instruct the terminal to remain in the RRC inactive state or enter an idle state from the RRC inactive state.

The transceiver 810 is further configured to send the third message to the first access network device.

Optionally, the third message is used to instruct the terminal to remain in the RRC inactive state.

The processor 820 is further configured to reset a validity period of a context of the terminal.

Optionally, the transceiver 810 is further configured to send second information to the terminal in the RRC connected state, where the second information is used to instruct the terminal to enter the RRC inactive state from the RRC connected state, and start a first timer.

The third information is sent by the first access network device based on first information that is sent by the terminal when the first timer expires.

Optionally, the second information further indicates a first validity period or first timer duration, and duration of the first timer is shorter than the first validity period or duration of the first timer is the first timer duration.

Optionally, the third message is used to instruct the terminal to remain in the RRC inactive state; and the third message is further used to instruct the terminal to restart the first timer; or the third message is further used to instruct the terminal to start a second timer, where the third message includes a second validity period or second timer duration, and duration of the second timer is shorter than the second validity period or duration of the second timer is the second timer duration.

The access network device 800 in this embodiment of this application may correspond to the second access network device in the communication methods in the embodiments of this application, and the foregoing and other operations and/or functions of modules of the access network device 800 are separately configured to implement corresponding procedures of the methods. For brevity, details are not described herein again.

Figure 9:
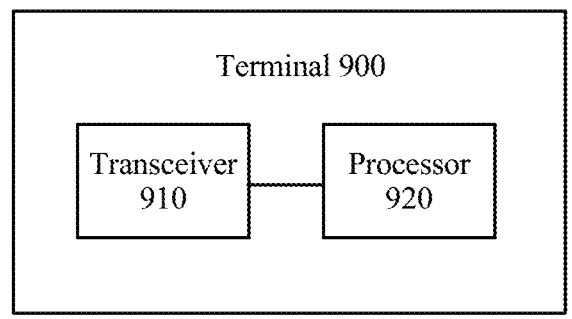
FIG. 9 is a schematic block diagram of a terminal according to another embodiment of this application.

FIG. 9 is a schematic block diagram of a terminal 900 according to another embodiment of this application. The terminal 900 may be the terminal in the foregoing method embodiments. As shown in FIG. 9, the terminal 900 includes: a transceiver 910, configured to: send fourth information to a third access network device, where the fourth information is used to indicate that the terminal has moved out of a first wireless network area in which the terminal is in a radio resource control RRC inactive state; and receive a fourth message sent by the third access network device; and a processor 920, configured to: make the terminal 900 enter an idle state from the RRC inactive state based on the fourth message, or keep the terminal 900 in the RRC inactive state based on the fourth message.

Optionally, the processor 920 is configured to: change the terminal 900 in the RRC inactive state to a first cell, where the first cell is not in the first wireless network area, and the third access network device is an access network device to which the first cell belongs; and in the first cell, make the terminal 900 enter the idle state from the RRC inactive state, or keep the terminal 900 in the RRC inactive state.

Optionally, the fourth message is used to instruct the terminal to remain in the RRC inactive state, and the fourth message includes information about a second wireless network area in which the terminal is in the RRC inactive state and/or a security parameter that are/is determined by the third access network device.

Optionally, the processor 920 is further configured to determine that there is an interface between the third access network device and a second access network device, where the second access network device is a serving access network device that is of the terminal in an RRC connected state before the terminal enters the RRC inactive state.

Optionally, the processor 920 is configured to: determine to change the terminal 900 in the RRC inactive state to a first cell, where the first cell is not in the first wireless network area, the third access network device is an access network device to which a cell in which the terminal is currently located belongs, the fourth message is used to instruct the terminal to enter the idle state from the RRC inactive state; and change the terminal 900 to the first cell, and make the terminal 900 enter the idle state from the RRC inactive state.

Optionally, the processor 920 is further configured to determine that there is no interface between a fourth access network device and a second access network device, where the fourth access network device is an access network device to which the first cell belongs, and the second access network device is a serving access network device that is of the terminal in an RRC connected state before the terminal enters the RRC inactive state.

The terminal 900 in this embodiment of this application may correspond to the terminal in the communication methods in the embodiments of this application, and the foregoing and other operations and/or functions of modules of the terminal 900 are separately configured to implement corresponding procedures of the methods. For brevity, details are not described herein again.

Figure 10:
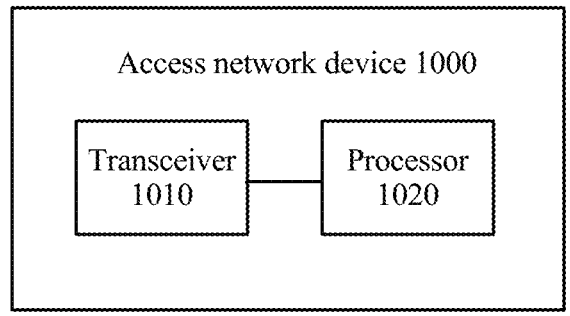
FIG. 10 is a schematic block diagram of an access network device according to still another embodiment of this application.

FIG. 10 is a schematic block diagram of an access network device 1000 according to still another embodiment of this application. The access network device 1000 may be an access network device such as the third access network device in the foregoing method embodiments. As shown in FIG. 10, the access network device 1000 includes: a transceiver 1010, configured to receive fourth information sent by a terminal, where the fourth information is used to indicate that the terminal has moved out of a first wireless network area in which the terminal is in a radio resource control RRC inactive state; and a processor 1020, configured to generate a fourth message, where the fourth message is used to instruct the terminal to enter an idle state from the RRC inactive state or remain in the RRC inactive state.

The transceiver 1010 is further configured to send the fourth message to the terminal, where the fourth message is used to instruct the terminal to enter the idle state from the RRC inactive state or remain in the RRC inactive state.

Optionally, the access network device is an access network device to which a first cell belongs, the first cell is not in the first wireless network area, and the first cell is a cell to which the terminal in the RRC inactive state changes.

Optionally, the fourth message is used to instruct the terminal to enter the idle state from the RRC inactive state.

The transceiver 1010 is configured to send fifth information to a second access network device, where the fifth information is used to indicate that the terminal has moved out of the first wireless network area, and the second access network device is a serving access network device that is of the terminal in an RRC connected state before the terminal enters the RRC inactive state.

Optionally, the fourth message is used to instruct the terminal to remain in the RRC inactive state.

The transceiver 1010 is configured to: send fifth information to a second access network device, where the fifth information is used to indicate that the terminal has moved out of the first wireless network area, and to request a context of the terminal, and the second access network device is a serving access network device that is of the terminal in an RRC connected state before the terminal enters the RRC inactive state; and receive a fifth message sent by the second access network device, where the fifth message includes the context of the terminal.

Optionally, the processor 1020 is further configured to determine a security parameter and/or a second wireless network area in which the terminal is in the RRC inactive state, where the fourth message includes information about the second wireless network area and/or the security parameter.

Optionally, the processor 1020 is further configured to switch a connection that corresponds to the terminal and that is between an access network and a core network.

Optionally, the access network device is an access network device to which a cell in which the terminal is currently located belongs, the terminal determines to switch from the cell in which the terminal is currently located to a first cell, and the first cell is not in the first wireless network area; the fourth message is used to instruct the terminal to enter the idle state from the RRC inactive state; and if the access network device is a serving access network device that is of the terminal in an RRC connected state before the terminal enters the RRC inactive state, the processor 1020 is further configured to release a context of the terminal; or if the access network device is not a serving access network device that is of the terminal in an RRC connected state before the terminal enters the RRC inactive state, the transceiver 1010 is further configured to send fifth information to a second access network device, where the fifth information is used to indicate that the terminal has moved out of the first wireless network area, and the second access network device is the serving access network device that is of the terminal in the RRC connected state before the terminal enters the RRC inactive state.

The access network device 1000 in this embodiment of this application may correspond to the third access network device in the communication methods in the embodiments of this application, and the foregoing and other operations and/or functions of modules of the access network device 1000 are separately configured to implement corresponding procedures of the methods. For brevity, details are not described herein again.

Figure 11:
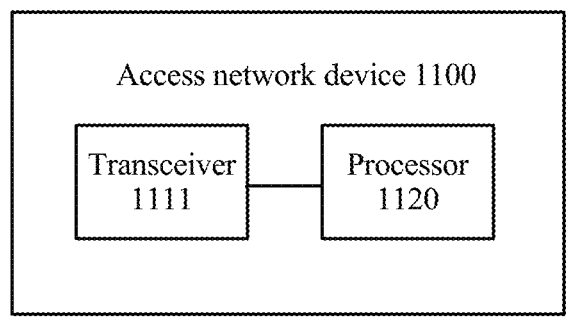
FIG. 11 is a schematic block diagram of an access network device according to still another embodiment of this application.

FIG. 11 is a schematic block diagram of an access network device 1100 according to still another embodiment of this application. The access network device 1100 may be an access network device such as the second access network device in the foregoing method embodiments. As shown in FIG. 11, the access network device 1100 includes: a transceiver 1110, configured to receive fifth information sent by a third access network device, where the fifth information is used to indicate that a terminal has moved out of a first wireless network area in which the terminal is in a radio resource control RRC inactive state, and the access network device is a serving access network device that is of the terminal in an RRC connected state before the terminal enters the RRC inactive state; and a processor 1120, configured to release a context of the terminal based on the fifth information.

Optionally, the third access network device is an access network device to which a first cell belongs, the first cell is not in the first wireless network area, and the first cell is a cell to which the terminal in the RRC inactive state changes.

Optionally, the fifth information is further used to request the context of the terminal.

The transceiver 1110 is further configured to send a fifth message to the third access network device, where the fifth message includes the context of the terminal.

Optionally, the third access network device is an access network device to which a cell in which the terminal is currently located belongs, the terminal determines to switch from the cell in which the terminal is currently located to a first cell, and the first cell is not in the first wireless network area.

Optionally, the processor 1120 is further configured to release a connection that corresponds to the terminal and that is between the access network device and a core network device.

The access network device 1100 in this embodiment of this application may correspond to the second access network device in the communication methods in the embodiments of this application, and the foregoing and other operations and/or functions of modules of the access network device 1100 are separately configured to implement corresponding procedures of the methods. For brevity, details are not described herein again.

Figure 12:
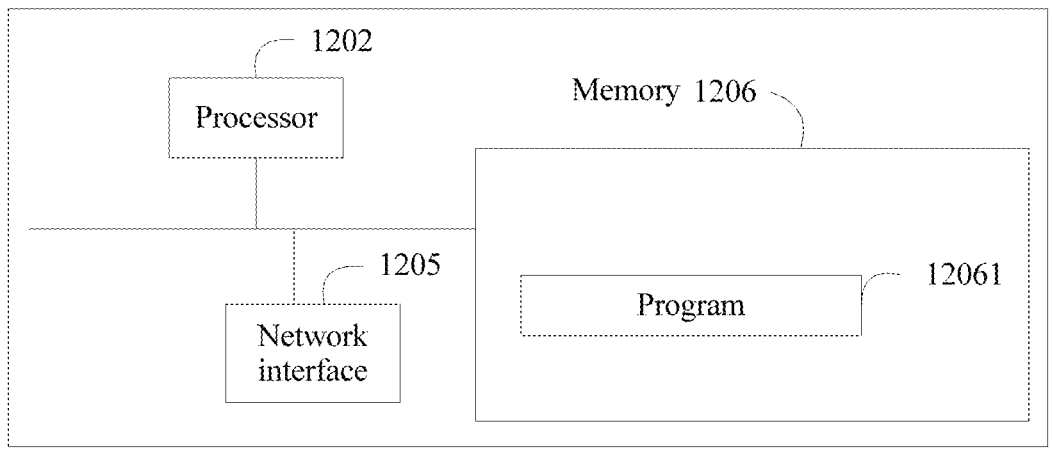
FIG. 12 is a schematic structural diagram of a terminal according to still another embodiment of this application.

FIG. 12 shows a structure of a terminal according to still another embodiment of this application. The structure includes at least one processor 1202 (for example, a CPU), at least one network interface 1205 or another communications interface, and a memory 1206. These pails communicate with and are connected to each other. The processor 1202 is configured to execute an executable module, such as a computer program, stored in the memory 1206. The memory 1206 may include a high-speed random access memory (RAM), or may include a non-volatile memory, for example, at least one disk memory. A communication connection to at least one other network element is implemented through the at least one network interface 1205 (which may be wired or wireless).

In some implementations, the memory 1206 stores a program 12061, and the processor 1202 executes the program 12061 to perform the methods according to the foregoing embodiments of this application.

Figure 13:
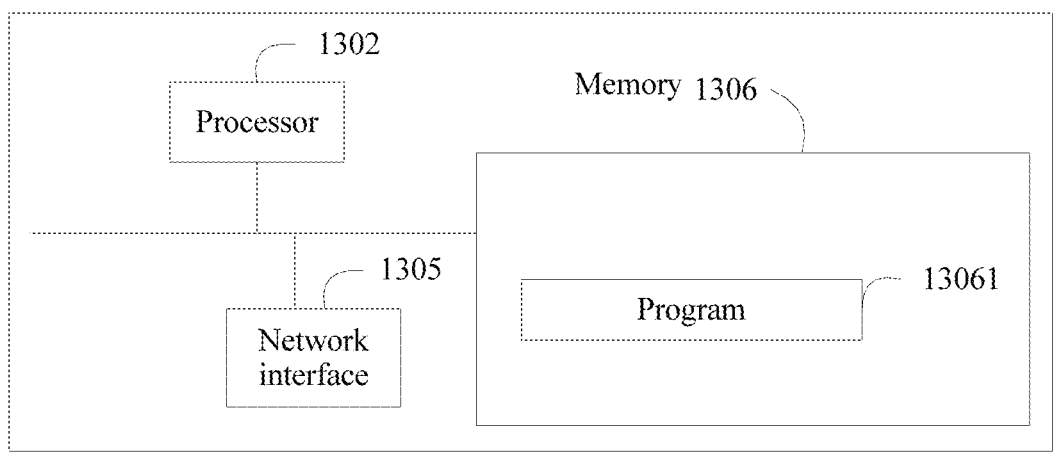
FIG. 13 is a schematic structural diagram of an access network device according to still another embodiment of this application.

FIG. 13 shows a structure of an access network device according to still another embodiment of this application. The structure includes at least one processor 1302 (for example, a CPU), at least one network interface 1305 or another communications interface, and a memory 1306. These parts communicate with and are connected to each other. The processor 1302 is configured to execute an executable module, such as a computer program, stored in the memory 1306. The memory 1306 may include a high-speed random access memory (RAM), or may include a non-volatile memory, for example, at least one disk memory. A communication connection to at least one other network element is implemented through the at least one network interface 1305 (which may be wired or wireless).

In some implementations, the memory 1306 stores a program 13061, and the processor 1302 executes the program 13061 to perform the methods according to the foregoing embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied in a terminal, comprising:
   in response to a first timer expiring, sending, when the terminal is in a radio resource control (RRC) inactive state, indication information to an access network device, the indication information comprising a request to initiate a RRC connection resume procedure;
   receiving a message from the access network device, wherein the message is in response to the indication information and indicates the terminal to remain in the RRC inactive state; and
   remaining in the RRC inactive state based on the message.

2. The method according to claim 1, wherein before sending, when the terminal is in the RRC inactive state, the indication information to the access network device, the method further comprises:
   receiving, when the terminal was in an RRC connected state, second information from a second access network device, wherein the second information instructs the terminal to enter the RRC inactive state from the RRC connected state, and the second access network device is a serving access network device for the terminal in the RRC connected state before the terminal enters the RRC inactive state; and
   entering the RRC inactive state from the RRC connected state based on the second information, and starting the first timer based on the second information.

3. The method according to claim 2, wherein duration of the first timer is indicated by the second information.

4. The method according to claim 1, wherein when the first timer expires, the terminal is located in a wireless network area, wherein the wireless network area is a radio access network-based notification area which comprises at least one cell, and the wireless network area is an area in which, when the terminal is in the RRC inactive state, the terminal performs cell reselection without notifying a network.

5. The method according to claim 4, wherein the indication information indicates that the terminal is located in the wireless network area.

6. A communications apparatus, comprising:
   a circuitry, configured to send, in response to a first timer expiring, when a terminal is in a radio resource control (RRC) inactive state, indication information to an access network device, the indication information comprising a request to initiate a RRC connection resume procedure;
   a circuitry, configured to receive a message from the access network device, wherein the message is in response to the indication information and indicates the terminal to remain in the RRC inactive state; and
   a circuitry, configured to remain the terminal in the RRC inactive state based on the message.

7. The apparatus according to claim 6, further comprising:
   a circuitry, configured to receive, when the terminal was in an RRC connected state and before sending, when the terminal is in the RRC inactive state, the indication information to the access network device, second information from a second access network device, wherein the second information instructs the terminal to enter the RRC inactive state from the RRC connected state, and the second access network device is a serving access network device that is of the terminal in the RRC connected state before the terminal enters the RRC inactive state; and
   a circuitry, configured to: make the terminal enter the RRC inactive state from the RRC connected state based on the second information, and start the first timer based on the second information.

8. The apparatus according to claim 7, wherein duration of the first timer is indicated by the second information.

9. The apparatus according to claim 6, wherein when the first timer expires, the terminal is located in a wireless network area, wherein the wireless network area is a radio access network-based notification area which comprises at least one cell, and the wireless network area is an area in which, when the terminal is in the RRC inactive state, the terminal performs cell reselection without notifying a network.

10. The apparatus according to claim 9, wherein the indication information is sent when the first timer expires, the indication information indicates that the terminal is located in the wireless network area.

11. A computer readable storage medium, wherein the computer readable storage medium stores an instruction, and when the instruction is executed, cause an apparatus to perform a method as follows:
- in response to a first timer expiring, sending, when a terminal is in a radio resource control (RRC) inactive state, indication information to an access network device, the indication information comprising a request to initiate a RRC connection resume procedure;
- receiving, a message from the access network device, wherein the message is in response to the indication information and indicates the terminal to remain in the RRC inactive state; and
- making the terminal remain in the RRC inactive state based on the message.

12. The medium according to claim 11, wherein the apparatus is further caused to perform:
- receiving, when the terminal was in an RRC connected state and before sending, when the terminal is in the RRC inactive state, the indication information to the access network device, second information from a second access network device, wherein the second information instructs the terminal to enter the RRC inactive state from the RRC connected state, and the second access network device is a serving access network device for the terminal in the RRC connected state before the terminal enters the RRC inactive state; and
- making the terminal enter the RRC inactive state from the RRC connected state based on the second information, and starting the first timer based on the second information.

13. The medium according to claim 12, wherein duration of the first timer is indicated by the second information.

14. The medium according to claim 11, wherein when the first timer expires, the terminal is located in a wireless network area, wherein the wireless network area is a radio access network-based notification area which comprises at least one cell, and the wireless network area is an area in which, when the terminal is in the RRC inactive state, the terminal performs cell reselection without notifying a network.

15. The medium according to claim 14, wherein the indication information indicates that the terminal is located in the wireless network area.

* * * * *